UNITED STATES PATENT OFFICE.

OSKAR KINDERMANN, OF LEIPSIC, GERMANY, ASSIGNOR TO HENRY WILLFORD, OF KINGSTON, ENGLAND.

PROCESS OF MANUFACTURING LITHOGRAPHIC PLATES.

SPECIFICATION forming part of Letters Patent No. 469,704, dated March 1, 1892.

Application filed July 7, 1891. Serial No. 398,684. (No specimens.) Patented in England May 15, 1890, No. 7,597.

*To all whom it may concern:*

Be it known that I, OSKAR KINDERMANN, a subject of the Emperor of Germany, residing at Lindenau, Leipsic, in the Empire of Germany, have invented certain new and useful Improvements in the Process of Manufacturing Lithographic Plates, (for which I have obtained Letters Patent in Great Britain, No. 7,597, dated May 15, 1890,) of which the following is a specification.

In the specification of a patent granted to me on the 3d day of February, 1891, No. 445,650, I described a certain process for the manufacture of lithographic plates in which chloride of zinc was employed. According to this invention I substitute chlorate of zinc for the chloride. I proceed as follows: Zinc plates are prepared by being passed over a fine sand-blast until their surface is uniformly dull. They are then washed with a sponge dipped in clean water having in it a few drops of the following mixture: chlorate of zinc, tetrachloride of tin, nitric acid, hydrochloric acid, and water. The moisture is wiped off with blotting-paper or similar material, and the same mixture of the full strength is then applied with a fine sponge and spread evenly over the surface by a brush applied softly in long strokes until the surface is dry. When the plate is dry, the dust on the surface is removed with a soft brush, and it will be found that the mixture has combined with the zinc of the plate to form a surface which can be used for any purpose in lithographic printing for which stones are used. The advantages of these plates are that they cost much less than the cheapest lithographic stone, that they are lighter and easier to work with, take up less room and capital for storing, and produce results equal to the best stone.

In the mixture of chlorate of zinc, tetrachloride of tin, nitric acid, hydrochloric acid, and water, the exact proportions of which are given below, oxycompounds are formed, which in contact with the zinc plates are precipitated and render the plates suitable for any purposes in lithographic printing for which stones are used. The following proportions, by weight, are employed: chlorate of zinc, one hundred parts; tetrachloride of tin, twenty-five parts; nitric acid, two parts; hydrochloric acid, two parts; water, twelve hundred parts.

What I claim is—

The process of manufacturing lithographic plates by treating zinc sheets with a mixture of chlorate of zinc, tetrachloride of tin, nitric acid, hydrochloric acid, and water, in about the proportions specified.

OSKAR KINDERMANN.

Witnesses:
   WM. SCHULTCHUS,
     *Imperial German Consul, Hull.*
   N. WOTEE,
     *Merchant, Hull.*